United States Patent [19]
Tamplen

[11] 3,784,214
[45] Jan. 8, 1974

[54] SEAL THAT IS RESPONSIVE TO EITHER MECHANICAL OR PRESSURE FORCE

[76] Inventor: Jack W. Tamplen, Rural Rt. No. 2, Celina, Tex. 75009

[22] Filed: Oct. 18, 1971

[21] Appl. No.: 190,086

[52] U.S. Cl............................. 277/116.8, 277/213
[51] Int. Cl............................ F16j 5/00, F16l 21/04
[58] Field of Search...................... 277/116.8, 116.4, 277/116.6, 213, 208

[56] References Cited
UNITED STATES PATENTS

| | | | |
|---|---|---|---|
| 266,848 | 10/1882 | Lewis............................. | 277/116.8 |
| 2,356,947 | 8/1944 | Pranger et al. ................ | 277/213 X |
| 3,215,208 | 11/1965 | Tamplen........................ | 277/116.8 |

*Primary Examiner*—Samuel B. Rothberg
*Attorney*—William T. Wofford et al.

[57] ABSTRACT

A sealing device for sealing between two concentrically disposed surfaces characterized by longitudinally movable shoulders for compressing the seal and a tubular, laterally expansible seal for effecting a seal intermediate the two surfaces in response to longitudinal compression by the shoulders; the seal being characterized by at least one annular ridge having an outer portion connected with two inner portions by two respective side walls, the side walls defining in cross section an angle $\alpha$ therebetween that is less than 90° in the set condition. Having an angle less than 90° in the set condition enables a relatively large compressive force to be generated in effecting a seal by engagement of the outer portion with the outer sealing surface. After setting, the seal is responsive to either mechanical force or pressure force in retaining its seal. Also disclosed are specific structural embodiments.

10 Claims, 6 Drawing Figures

PATENTED JAN 8 1974 3,784,214

INVENTOR
Jack W. Tamplen
BY
Wofford Felsman & Fails
ATTORNEYS

SEAL THAT IS RESPONSIVE TO EITHER MECHANICAL OR PRESSURE FORCE

BACKGROUND OF THE INVENTION

1. Field of the Invention

This invention relates to sealing devices. More particularly, it relates to sealing devices for effecting a fluid impermeable seal between adjacent surfaces. In a particular embodiment, it relates to a device for producing a seal between an interior concentrically disposed tubular surface in a piece of apparatus, such as a packer or bridge plug, and the inside wall of a conduit, such as tubing or casing, in a well penetrating subterranean formations.

2. Description of the Prior Art

The prior art has seen the development of many and varied types of seals for effecting a seal between surfaces. In the technology of oil field production alone, a wide variety of sealing devices have been provided. The myriad devices that have been employed would require volumes to describe. It is sufficient to note that the prior art has not provided a seal means, or sealing device, which provides the following desirable features. In fact, insofar as I am aware, the prior art has not developed a seal that will provide even one of the following desirable features. Specifically, a seal means, or sealing device, for use downhole in a well penetrating subterranean formations should have the following desirable features: (1) a seal having the combined characteristics of a compression set seal and a pressure energized seal; (2) a seal that when compressed longitudinally can produce a radially expanding force greater than that initially required to compress the seal longitudinally; (3) a seal having more than one point of sealing within the conduit and on the exterior of the tubular surface; (4) a seal whose ability to hold pressure when expanded between the tubular surface and the inside of the conduit, does not depend upon the amount of longitudinal compression retained thereon; (5) a seal that can be set like a compression seal yet function like a pressure-energized seal; (6) a seal that can be set like a pressure-energized seal and yet function like a compression seal; (7) a seal that seals at various points on its interior and exterior but is not required to seal at its ends; (8) a seal that is pressure-energized without having a limiting compression load to prevent folding inward and, therefore, becoming inoperable; (9) a seal that has separate expandable back-ups at either end, the expandable back-ups being expanded outwardly and held against the conduit wall by the high radial force generated by the ends of the seal during and after compression; (10) a seal that has expansible coil spring back-ups that uniformly distribute the load to both sides of the coil spring and do not require the rubber embedment surrounding the coil spring to hold pressure, per se; (11) to provide a seal having a coil spring back-up wherein the back-up can tolerate greater distances between the exterior of the tubular surface and the interior of the conduit without exceeding the radius of the coil spring back-up; (12) a seal having a coil spring back-up which produces a minimum of compressive mechanical force across the coils of the spring; and (13) a seal having a coil spring back-up that allows construction from a larger wire size for producing maximum back-up strength.

DESCRIPTION OF THE PREFERRED EMBODIMENTS

Figures 1, 2, 3, 4, 5, 6:
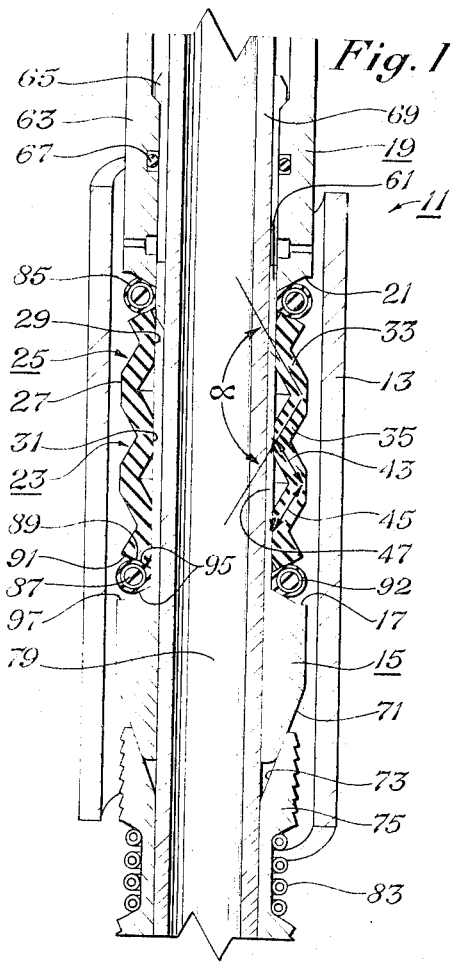
FIG. 1 is a partial cross sectional view showing one embodiment of this invention in the unset condition.
FIG. 2 is a partial cross sectional view of the embodiment of FIG. 1 in the set condition.
FIG. 3 is a partial cross sectional view of one side of another embodiment of this invention.
FIG. 4 is a partial cross sectional view of one side of still another embodiment of this invention.
FIG. 5 is a partial cross sectional view of a seal back-up coil spring correctly designed in accordance with an embodiment of this invention.
FIG. 6 is a partial cross sectional view of a seal back-up coil spring that is incorrectly designed and illustrates a failing of the prior art sealing devices.

It is an object of this invention to provide a seal means which is expansible, retractable, compression set and pressure energized to seal in two directions and obviate the deficiencies of the prior art sealing devices.

It is also an object of this invention to provide a sealing device having one or more of the desirable features delineated hereinbefore. It is a specific object of this invention to provide a sealing device having all of the desirable features delineated hereinbefore.

These and other objects will become apparent from the following descriptive matter taken in conjunction with the drawings.

Referring to FIGS. 1 and 2, the sealing device 11 is illustrated as being emplaced within a conduit 13, such as tubing or casing, of a well penetrating subterranean formations. It is to be realized that the sealing device 11 may be employed in any environment in which it is desired to seal between two co-extensive surfaces with a resilient seal means. The description and drawing are given, however, with respect to sealing between an elongated tubular surface on the exterior of a mandrel and the conduit 13 in a well bore penetrating subterranean formations, since it is in this context that the seal was developed and in which it has its greatest usefulness.

Basically the sealing device 11 comprises a mandrel 15 having a first protruding annular shoulder 17 for supporting a seal means in compression; a compression means 19 having a second annular shoulder 21 movable longitudinally of the mandrel 15 for supplying a first compressive force to a seal means supported against the first annular shoulder 17; and a tubular expansible seal means 23 for effecting a seal intermediate the elongate exterior sealing surface 37 of the mandrel 15 and the surrounding cylindrical surface 39, such as the internal wall of conduit 13.

Considering the last element first, the seal means 23 is disposed intermediate the first and second annular shoulders 17 and 21. The seal means 23 comprises at least one annular ridge 25 having an outer diameter portion 27 connected with two inner diameter portions 29 and 31 by two respective sides or side walls, 33 and 35. The side walls 33 and 35 define, in cross section, an angle α therebetween that is greater than 90° in the unset position, or condition, such that relatively small movement of the inner diameter portions 29 and 31 toward each other initially effects a relatively rapid radial expansion of the outer diameter portion 27 outwardly to engage the conduit 13. As can be seen in FIG. 2, however, the angle α is less than 90° in the set condition such that the compressive force able to be generated in effecting a seal by engagement of the outer diameter portion 27 with the conduit 13 is greater than the initial compressive force imposed by the compression means 19 in compressing the seal means 23 against the first annular shoulder 17. The seal means 23 effects sealing engagement of its inner diameter portions 29 and 31, FIG. 2, with the outer surface 37 of the mandrel 15. The seal means 23 also effects sealing engagement of its outer diameter portions 27 with the inner surface 39 of conduit 13. Moreover, after sealing engagement has been effected, the seal means 23 is also pressure-energized, as well as being mechanically energized, such that even if the first compressive force is subsequently released, the seal means 23 will continue to hold a contained high pressure. When the compressive force exerted by the annular shoulders is released, the seal means 23 has, however, a resiliency such that it will elongate and contract radially against a predetermined low differential pressure less than a dangerous differential pressure that is sufficient to cause damage, as by blowing the sealing device 11 longitudinally of the conduit 13. The amount of radial contraction is at least sufficient to effect release of the sealing engagement of the seal means 23 with the conduit 13.

Preferably, the seal means 23 has a plurality of the annular ridges 25 to ensure sealing, even if there be a surface discontinuity adjacent one of the sealing surfaces of one of the ridges 25. The side walls and the angles of intersection of adjacent side walls 33 and 35 are the primary reasons for the increased efficacy of the seal means 23 and for its providing the desirable features delineated hereinbefore. Perhaps the reasons can best be seen from considering the force triangle effected by a cross section of one of the ridges as it intersects the outer surface 37 of the mandrel and the inner surface 39 of the conduit 13 after being set; as compared with the force triangle in normal repose. Specifically, in FIG. 1, the respective side walls 33 and 35 of the typical annular ridge 25 may be represented by a first side 43 of the cross sectional triangle, a second side 45, and a third side 47 lying along the outer surface 37. For clarity, the sides 43 and 45 are represented with respective arrow heads. As illustrated, the sides 43 and 45 form equal legs of an isosceles triangle. While this structure is advantageous in effecting a seal means 23 with symmetrical annular ridges 25, it is not necessary that the sides 43 and 45 always be equal. Since the angle α at repose is greater than 90°, it follows that the angles of intersection of the sides 43 and 45 with the third side 47 must each be less than 90°. The angles are 30° for the illustrated embodiment of the seal means 23. With such a seal means 23, using a trigonometric relationship of a 30°–60° triangle, it will be found that with 260 pounds of compression applied by the compression means 19, an initial force of 150 pounds will be generated radially (less seal friction and internal stress) to expand the seal means' outer diameter portion 27 outwardly. During the initial compression, as the outer diameter porton 27 is being expanded outwardly, the relatively low radial load of 150 pounds is beneficial since the attendant large outward expansion is helpful in driving the outer diameter portion 27 into contact with the conduit 13. As the seal means 23 is compressed further, however, the initial rapid lateral expansion of the seal means 23 begins to decrease, and the radial mechanical advantage increases considerably. For example, when the angle α has decreased from the initial 120° to 30°, as occurs at the point of contact in the ideally designed seal means 23, and as illustrated by the intersection of the sides 43 and 45 in FIG. 2, the 150 pound radial component will have increased significantly such that the outer diameter portion 27 will sealingly engage the internal surface 39 of the conduit 13 with a force of 970 pounds, assuming that the physical properties of the material of construction will sustain this force. The durometer hardness of the material and the thickness of the side walls 33 and 35 will determine the ultimate maximum radial load that is exerted. When the seal means 23 is formed of a resilient elastic material, the side walls will begin to deform, as by being shortened and fattened during the longitudinal compression and radial expansion of the seal means 23. Consequently, the hardness and thickness of the material employed in the seal should be such as to deliver the desired amount of radial force. Preferably, the hardness and thickness of the material in the side walls 33 and 35 are chosen such that there is joinder of the side walls 33 and 35 to effect substantial closing of the seal corrugates, or annular ridges 25, in the set condition.

The outer diameter portions 27 and the inner diameter portions 29 and 31 serve as sealing hinge points. Consequently, other forms of construction may be employed to effect the final desired result, yet reduce the internal stress, or bending force, required at the intersections of the side walls 33 and 35. For example, the seal means 23 may be cut away at the intersection lines 49 and 51, FIG. 3; or the side walls 33 and 35 may be completely separated to form discrete joints 53 and 55, FIG. 4. As illustrated in FIG. 4, the respective side walls 33 and 35 are discrete annular rings that have longitudinal ends that are inclined to match the adjoining end of an adjacent side wall and form the joints 53 and 55. FIGS. 3 and 4 illustrate a partial cross sectional view of only one side of the seal means 23, the mandrel 5 and the compression means 19.

As illustrated, the mandrel 15 comprises an expander mandrel that has a reduced upper end 61 defining the outer surface 37 against which the seal means 23 seats. The reduced upper end telescopes within back-up mandrel 63 and has collet fingers 65 that facilitate assembly, among other things. For example, the slots between the collet fingers define a fluid communication passageway intermediate a seal comprising o-ring 67 and an inner elongate mandrel 69.

The mandrel 15 has a cone-shaped lower incline 71 that mates with incline 73 on slips 75 for helping to set the slips 75. Moreover, when the slips 75 engage the conduit 13, FIG. 2, the mandrel 15 is supported against downward longitudinal movement. Consequently, the first annular shoulder 17 supports the seal means 23 against a longitudinally compressive force such as delivered by the compression means 19.

The compression means 19 comprises the back-up mandrel 63 that moves longitudinally telescopically over the upper end 61, as indicated. In response to longitudinal movement, the compression force is supplied by way of second annular shoulder 21 for compressing the seal means 23 against the supporting first annular shoulder 17.

The inner mandrel 69 and the back-up mandrel 63 are ultimately connected, by a suitable interconnection means, with a setting means, such as a setting tool (not shown). Such interconnection means and setting tools are well known in the art and need not be described in detail herein. It is sufficient to note that the setting tool has a piston assembly portion and a cylinder assembly portion that are moved longitudinally with respect to each other by a charge means contained within the setting tool. The respective relative longitudinal movements of the piston and cylinder assembly portions of the setting tool are transmitted respectively to the inner mandrel 69 and the back-up mandrel 63. Responsive to this relative longitudinal motion, the opposed inclines 71 and 77, FIG. 2, move toward each other, expanding the slips 75 outwardly. When the slips 75 engage the wall of conduit 13, they stop the downward movement of the mandrel 15 and its first annular shoulder 17. Consequently, seal means 23 is compressed as the second annular shoulder 21 of the compression means 19 continues to move downwardly. The mechanical details of the interconnection and releasing means and the latching means that enable leaving the sealing device emplaced in conduit 13 are described explicitly in my co-pending application entitled "Seal Assembly" (PW-181), Ser. No. 190,085 filed even date herewith. Those details afford a complete story of the most advantageous mode of operation and apparatus for most advantageous use, and the details of that specification are embodied herein by reference for that purpose. They are not directed at understanding the invention being described and claimed herein, however, and are consequently omitted, since they would make this specification unduly and unnecessarily long.

The seal means 23 may be made of any expansible material having the requisite resiliency and durometer hardness. Ordinarily, it is advantageous to employ tough materials that are resistant to attack by the borehole fluids. Such materials may comprise metals, particularly for seal installations subjected to extreme temperatures; thermoplastic plastics; or elastomeric materials. The elastomeric materials include rubber-like materials that are specially treated to resist attack by the hydrocarbonaceous fluids in the borehole, and are particularly inclusive of the synthetic oil-resistant rubbers, such as Neoprene and Buna-N. When metallic seal means 23 are employed, the degree of physical radial contraction into a non-sealing position, when mechanical and pressure forces are sufficiently lowered, will be less than the radial contraction exhibited by the elastomeric seal means. Also, the metallic seal means do not ordinarily require the seal back-ups, described later hereinafter. The metals that are employed will have the malleability, elasticity and resiliency to perform the minimum functions of seal means 23, as described herein. The metals may include the copper alloys and iron alloys, such as the soft steels.

In operation, the mandrel 15, the seal means 23 and the compression means 19 of the sealing device 11 are assembled and connected with a setting tool as described hereinbefore. The sealing device 11 and the setting tool are run into the conduit 13 through conventional well head and lubricator equipment; and emplaced at the desired depth. Thereafter, the relative longitudinal movement between the inner mandrel 69 and the back-up mandrel 63 is initiated, as by detonating the charge means within the setting tool. The slips 75 are expanded outwardly to engage the conduit 13 and immobilize the mandrel 15 at the predetermined desired depth in the conduit 13. Subsequent relative longitudinal motion is spent as relative downward motion of the compression means 19, compressing the seal means 23 against the first annular shoulder 17 of the immobilized mandrel 15. Consequently, the seal means 23 is compressed into its set position, as illustrated in FIG. 2, wherein the angle $\alpha$ has less than 90°, to thereby magnify the force with which the outer diameter portions 27 of the seal means 23 engage the inner surface 39 of the conduit 13 and with which the inner diameter portions 29 and 31 engage the outer surface 37 of the reduced upper portion 61 of the mandrel 15. Specifically, as delineated hereinbefore, the inner and outer diameter portions may engage their respective sealing surfaces with a force that is greater than the compression force supplied by the compression means 19 to the extent that the physical properties of the seal are sufficient to withstand a force of that magnitude. After the seal is set, the respective interconnection and release means are actuated to release the seal means 23, compression means 19, and mandrel 15 from the setting tool; the latching means having been actuated in the process. Thereafter, the setting tool is removed from the well bore, leaving the seal means 23 set in sealing engagement intermediate the outer surface 37 and the inner surface 39; preventing fluid communication between the interior of conduit 13 above and below the seal means 23, except by way of the bore 79 within the inner mandrel 69. Flow through the bore 79 may be obstructed or controlled by a suitable terminal device appended to a lower connection means 81, FIG. 2. For example, the terminal device may comprise a pressure equalizing device such as described in my U.S. Pat. No. 3,581,819, entitled "Pressure Equalizing Apparatus". With such a pressure equalizing device, an equalizing prong may be employed to allow the pressure to equalize on both sides of the seal means 23 so the seal means 23 can be released and removed from the well. As indicated hereinbefore, after the latching means has been unlatched and the compressive force exerted by the compression means 19 has been released, the seal means must have sufficient return memory and resiliency to return to its more elongate state, with attendant lateral contraction of the outer diameter portions 27 sufficient to clear the interior of the conduit 13 for removal.

It is significant to note that the seal means 23 is pressure actuated, as well as being responsive to a longitudinal compressive force imposed by the compression means 19 against the mandrel 15. Specifically, if there is a pressure differential across the seal means 23 greater than the dangerous differential pressure referenced hereinbefore, the seal means 23 will be retained in engagement against the pressure. Expressed otherwise, the pressure acting against the respective sides 43 or 45, depending upon the direction of the pressure differential, will maintain the seal in its compressed, sealing state, even though the mechanical compressive force has been released, as by unlatching the latching means. Consequently, it is necessary to reduce the differential pressure across the seal means 23 below the dangerous differential pressure before the seal means 23 will be released. The safety feature in which the pressure actuation feature of the seal means 23 is enhanced by employing double slips such as slips 75 is particularly described and claimed in my above referenced co-pending application, Ser. No. 190,085, filed even date herewith. Since that safety feature is not being claimed, per se, herein, it need not be described in detail herein. It is sufficient to note that the respective opposed inclines 71 and 77 and their matching inclines on the double slip 75 allow the double slip 75 to be retained in engagement with the conduit 13 as long as there is a differential pressure across the seal means 23. Once the pressure differential is at or below the predetermined low pressure described hereinbefore, the seal means 23 elongates, contracting laterally and destroying the seal. This allows the double slips 75 to be retracted inwardly by the garter springs 83, as illustrated in FIG. 1. Thereafter, the sealing device 11 may be removed from conduit 13.

In using this seal means 23, it has been found advantageous to employ seal back-ups to prevent extrusion of the seal means 23 into the annular recess, or space, between the conduit 13 and the respective downstream annular shoulder. The respective back-ups are annular rings that are illustrated in cross section by the top back-up 85 and the bottom back-up 87. The back-ups are provided at each end of the seal means 23. The back-ups interface with the respective ends of the seal means 23; for example, interface 89 between the end 91 and the back-up 87; such that the back-ups are expanded outwardly to support the thrust load of the seal means 23. The thrust load comes both from the pressure differential across the seal means 23 and from the longitudinal compression force as the seal means 23 is compressed longitudinally to retain sealing engagement with the adjacent inner and outer surfaces 37 and 39.

The back-ups have elastic properties such that they retract inwardly when the seal means is allowed to elongate, or expand longitudinally, and contract laterally. As illustrated, the back-ups 85 and 87 comprise coil springs 92 that are embedded in rubber. Each of the back-ups has inwardly angled faces 95 that aid in expansion of the back-up. More importantly, the faces 95 cause the back-up to expand uniformly outwardly and to maintain this uniform expansion as long as the seal means 23 is held in its compressed, or set, condition. The respective annular shoulders 17 and 21 have squared-off portion 97 at the periphery of their radial surface for conformingly supporting the curvature of the coil spring back-up 85 or 87 when the back-up is in the expanded position as illustrated in FIG. 2. The back-ups 85 and 87 are separated from the seal means 23 and function only as a means for preventing extrusion of the seal means 23. The back-ups 85 and 87 are not required to seal. As indicated hereinbefore, however, they are required to expand outwardly when the seal means 23 is compressed longitudinally so as to support the thrust load of the seal means 23 over the annular recess. They are also required to retract back to their original position when the seal is unset. Thus, the expansion of the rubber embedded coil spring back-ups must not exceed the elastic limits of the coil spring or rubber in which it is embedded.

As implied hereinbefore, the rubber embedment about the coil spring 92 distributes the load across the internal cross sectional diameter of the back-up 87 such that the interior of the coil spring in back and the exterior of the coil spring in front, or next to the seal means 23, will each take its share of the load. Also, the rubber embedment supports the coils or the springs internally, thereby reducing tendency of the spring coils to "lay over", or become inclined at an angle to its normal radial when subjected to a high loading. I have found that embedding the respective coil spring in rubber improves the ability of the coil spring to withstand the compressive forces by approximately 225 percent. The rubber bedding must be at least flush with the maximum radius of the coil spring. In addition, to have a properly designed back-up, the radius R of the coil spring 92, FIG. 5, used in the back-up must be greater than the distance D between the exterior of the annular shoulder 21 and the conduit 13 in order to effect the desired resistance to the laying over, or collapse, of the spring coil 92. For example, if the radius $R_1$ is less than the clearance $D_1$, FIG. 6, the spring coils 101 are then compressed between the external wall of the shoulder 21 and the interior 39 of the conduit 13. As a result, the load across the coil 101 will effect an early collapsing of the spring coil 101 and thus, failure of the coil spring back-up. Moreover, the larger the diameter of the coil spring back-up, the greater the clearance D can be without exceeding the radius R and the larger the size of wire that can be employed in manufacturing the coil spring. Use of the larger wire size allows effecting a higher elastic limit of the coil spring so that the back-up will not exceed its elastic limit when stretched to its expanded position supporting the seal means 23. Since the coil spring back-ups are not required to seal, they can have a larger radius R with less rubber exteriorly of the coil spring than would be possible if they were incorporated into the seal means, per se, or were required to seal. The practical significance of having seal back-ups with large radii R is that a given downhole sealing device has greater flexibility, since it can be employed in more different diameter conduits without the clearance, or recess, D exceeding the radius R, all as described hereinbefore.

In operation, the respective top and bottom back-ups 85 and 87 are emplaced adjacent their respective ends of the seal means 23 intermediate the ends of the seal and the respective annular shoulders 17 and 21. Thereafter, when the compressive force is employed to set the seal means 23, as described hereinbefore, the respective back-ups 85 and 87 expand outwardly, as illustrated in FIG. 2, to bridge the recess, or clearance, D intermediate the external walls of the respective annular shoulders and the conduit 13 and support the seal means 23 against any force tending to extrude the seal means 23 into the recess D.

When the seal means 23 is allowed to elongate and contract radially, the respective back-ups 85 and 87 also contract radially such that they return toward their initial position, illustrated in FIG. 1, sufficiently to facilitate removal of the sealing device 11 from the conduit 13.

As described hereinbefore, the seal means 23 comprises an annular ridge that effects sealing closure with concentric sealing surfaces to define in cross section a substantially triangular figure. If desired, the ring, or ridge-forming structure, that is employed, can be; instead of the positive annular ridge such as illustrated by ridge 25; an inverted, or "negative", ridge, such as defined by the adjacent valley between the two illustrated ridges. It is only imperative that the ridge-forming structure have an apex portion connected with two base portions by the two side walls defining the angle $\alpha$ therebetween, and that the respective portions be movable to sealingly engage their respective adjacent sealing surface.

The seal back-ups increase the flexibility of the sealing device 11 and are desirable. They are not necessary, however, where the exterior of the annular shoulders of the sealing device fits closely adjacent the surface against which the seal is to be made; exemplified by a small clearance D, FIG. 5. The closeness will depend upon the differential pressure to be sustained and the resistance of the seal means to extrusion under the force of the differential pressure.

The materials of construction ordinarily employed in this art may be employed herein and no exotic new materials are necessary.

From the foregoing description and drawings, it will be apparent that this invention provides a sealing device that obviates the disadvantages of the prior art and provides the objects set out hereinbefore. Specifically, this invention provides a sealing device which provides one or more of the desirable features delineated hereinbefore and not heretofore provided in the prior art. Particularly, this invention provides a sealing device which has all of the desirable features delineated hereinbefore.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A sealing device for sealing a concentric annular passageway between two concentrically disposed cylindrical surfaces, comprising:
   a. a mandrel having a first protruding annular shoulder for supporting a seal means in compression and carrying an elongate tubular sealing surface for effecting a seal with a seal means;
   b. compression means having a second annular shoulder movable longitudinally of said mandrel for supplying to a seal means supported against said first annular shoulder a first compressive force to initiate setting thereof; and
   c. tubular expansible seal means for effecting a seal intermediate the sealing surface carried by said mandrel and the surrounding cylindrical surface; said seal means being disposed intermediate said first and second annular shoulders and movable from an unset position into a set position; said seal means having a plurality of ridges, said ridges comprising a plurality of annular rings having a plurality of apex portions that are at least partly cut away to reduce bending stress during setting; each said apex portion being connected with two base portions via two respective side walls; said side walls defining in cross section an angle α therebetween that is less than 90° in the set position such that the compressive force able to be generated in effecting a seal by engagement of one of said portions with said surrounding cylindrical surface is greater than said first compressive force; said seal means effecting in the set position sealing engagement of the respective portions with said elongate tubular sealing surface and with said surrounding cylindrical surface with the same force and such that even if said first compressive force is subsequently released, said seal means will continue to hold a contained pressure; said seal means having a resiliency such that it will elongate and contract radially against a predetermined low differential pressure that is less than a dangerous differential pressure when the compressive force exerted by said annular shoulders is released; the amount of radial contraction being sufficient to effect a release of the sealing engagement of said seal means with surrounding cylindrical surface.

2. The sealing device of claim 1 wherein said seal means is severed at its cross sectional apices such that respective side walls are discrete annular rings with ends that are inclined to match the adjoining end of an adjacent side wall.

3. The sealing device of claim 1 wherein rubber-embedded coil spring back-ups are provided at each end of said seal means, said back-ups interfacing with the respective ends of said seal means and the respective annular shoulder such that said back-ups are expanded outwardly to support the thrust load, both from compression and pressure differential, as said seal means is moved into its set position; said back-ups retracting inwardly when said seal means is moved to its unset position.

4. A sealing device for sealing a concentric annular passageway between two concentrically disposed cylindrical surfaces, comprising:
   a. a mandrel having a first protruding annular shoulder for supporting a seal means in compression and carrying an elongate tubular sealing surface for effecting a seal with a seal means;
   b. compression means having a second annular shoulder movable longitudinally of said mandrel for supplying to a seal means supported against said first annular shoulder a first compressive force to initiate setting thereof;
   c. tubular expansible seal means for effecting a seal intermediate the sealing surface carried by said mandrel and the surrounding cylindrical surface; said seal means being disposed intermediate said first and second annular shoulders and movable from an unset position into a set position; said seal means comprising at least one annular ring having an apex portion connected with two base portions via two respective side walls; said side walls defining in cross section an angle α therebetween that is less than 90° in the set position such that the compressive force able to be generated in effecting a seal by engagement of one of said portions with said surrounding cylindrical surface is greater than said first compressive force; said seal means effecting in the set position sealing engagement of the respective portions with said elongate tubular sealing surface and with said surrounding cylindrical surface with the same force and such that even if said first compressive force is subsequently released, said seal means will continue to hold a contained pressure; said seal means having a resiliency such that it will elongate and contract radially against a predetermined low differential pressure that is less than a dangerous differential pressure when the compressive force exerted by said annular shoulders is released; the amount of radial contraction being sufficient to effect a release of the sealing engagement of said seal means with said surrounding cylindrical surface; and d. rubber embedded coil spring backups disposed at each end of said seal means, said back-ups interfacing with the respective ends of said seal means and the respective annular shoulders such that said back-ups are expanded outwardly to support the thrust load, both from compression and pressure differential, as said seal means is moved into its set position; said back-ups retracting inwardly when said seal means is moved to its unset position, each coil spring of each said back-up having a radius R that is greater than the annular recess clearance D between the outer diameter of the adjacent annular shoulder and the inner diameter of the surrounding cylindrical surface.

5. The sealing device of claim 4 wherein said back-ups are non-sealing, and wherein said rubber embedment of each back-up is sufficient to distribute the thrust load to both the upstream and downstream coils of the spring thereof and to retain said coils near their normal radial and prevent laying over.

6. The sealing device of claim 4 wherein said side walls of said seal means become contiguous along their sides in being compressed into the set position such that said seal means also thereby becomes a compression seal.

7. A sealing device for sealing between coextensive surfaces comprising:
   a. a first surface having a first protruding shoulder for supporting a seal means in compression;
   b. compression means having a second shoulder movable longitudinally with respect to said first surface for supplying to a seal means supported against said first shoulder a first compressive force to initiate setting thereof; and
   c. expansible seal means for effecting a seal intermediate said first surface and the second co-extensive surface; said seal means being disposed intermediate said first and second shoulders and movable from an unset position into a set position; said seal means comprising a plurality of ridge-forming structures having respective apex portions connected with two base portions by two respective side walls; each said ridge-forming structure being a ridge that has as its apex portion an outer portion connected via said side walls with two inner portions serving as its base portions; said inner portions sealingly engaging said first surface, and said outer portion sealingly engaging said second co-extensive surface when said seal means is in the set position; said side walls defining in cross section an angle $\alpha$ therebetween that is less than 90° in the set position such that the compressive force able to be generated in effecting a seal by engagement of the outer apices of said ridges with said second co-extensive surface is greater than said first compressive force; said seal means effecting in the set position sealing engagement of the respective portions with said first surface and with said second co-extensive surface with the same force and such that even if said first compressive force is subsequently released, said seal means will continue to hold a contained pressure; said seal means having a resiliency such that it will elongate and contract radially against a predetermined low differential pressure that is less than a dangerous differential pressure when the compressive force exerted by said shoulder is released; the amount of contraction being sufficient to effect a release of the sealing engagement of said seal means with said second coextensive surface; said seal means being at least partly cut away at its cross sectional apices to reduce bending stress during setting.

8. A sealing device for sealing between coextensive surfaces comprising:
   a. a first surface having a first protruding shoulder for supporting a seal means in compression;
   b. compression means having a second shoulder movable longitudinally with respect to said first surface for supplying to a seal means supported against said first shoulder a first compressive force to initiate setting thereof;
   c. expansible seal means for effecting a seal intermediate said first surface and the second co-extensive surface; said seal means being disposed intermediate said first and second shoulders and movable from an unset position into a set position; said seal means comprising at least one ridge-forming structure having an apex portion connected with two base portions by two respective side walls; said side walls defining in cross section an angle $\alpha$ therebetween that is less than 90° in the set position such that the compressive force able to be generated in effecting a seal by engagement of one of said portions with said second co-extensive surface is greater than said first compressive force; said seal means effecting in the set position sealing engagement of the respective portions with said first surface and with said second co-extensive surface with the same force and such that even if said first compressive force is subsequently released, said seal means will continue to hold a contained pressure; said seal means having a resiliency such that it will elongate and contract radially against a predetermined low differential pressure that is less than a dangerous differential pressure when the compressive force exerted by said shoulders is released; the amount of contraction being sufficient to effect a release of the sealing engagement of said seal means with said second co-extensive surface; and
   d. rubber embedded coil spring backups disposed at each end of said seal means, said back-ups interfacing with the respective ends of said seal means and the respective annular shoulder such that said back-ups are expanded outwardly to support the thrust load, both from compression and pressure differential, as said seal means is moved into its set position; said back-ups retracting inwardly when said seal means is moved into its unset position; each coil spring of each said back-up having a radius R that is greater than the recess clearance D between the outer surface of the adjacent shoulder and the inner surface of the second co-extensive surface.

9. The sealing device of claim 8 wherein said back-ups are non-sealing, and wherein said rubber embedment of each back-up is sufficient to distribute the thrust load to both the upstream and downstream coils of the spring thereof and to retain said coils near their normal angle and prevent laying over.

10. The sealing device of claim 8 wherein said side walls of said seal means become contiguous along their sides in being compressed into the set position such that said seal means also thereby becomes a compression seal.

* * * * *